United States Patent Office 3,542,774
Patented Nov. 24, 1970

3,542,774
3,4-DIHYDROBENZOXAZINONES
John Shavel, Jr., Mendham, and George Bobowski, Morristown, N.J., assignors to Warner-Lambert Pharmaceutical Company, Morris Plains, N.J., a corporation of Delaware
No Drawing. Continuation-in-part of application Ser. No. 504,142, Oct. 23, 1965. This application July 5, 1968, Ser. No. 742,518
The portion of the term of the patent subsequent to May 27, 1986, has been disclaimed
Int. Cl. C07d 87/08
U.S. Cl. 260—244                                47 Claims

ABSTRACT OF THE DISCLOSURE

The present invention describes 3,4-dihydrobenzoxazinones of the formula:

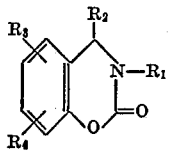

wherein $R_1$, $R_2$, $R_3$ and $R_4$ are described below. These compounds are useful as anti-inflammatory agents.

---

This application is a continuation-in-part application of our copending application, Ser. No. 504,142, filed Oct. 23, 1965, now U.S. Pat. No. 3,446,804.

This invention relates to compositions of matter. More particularly, this invention relates to new and novel 3,4-dihydrobenzoxazinones and process for their production.

The new and novel 3,4-dihydrobenzoxazinones may be represented by the formula:

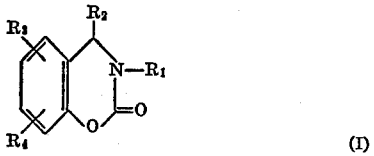

wherein $R_1$ may be straight or a branched chain alkyl of 1 to 6 carbon atoms; lower alkenyl such as allyl, methylallyl, dimethylallyl, cycloalkyl such as cyclopropyl, cyclopropylmethyl, cyclopentyl, cyclohexyl, and the like; $R_2$ may be

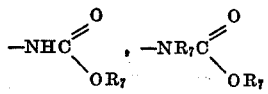

in which $R_7$ has the same significance as $R_1$

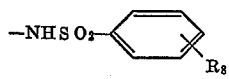

in which $R_8$ may be lower alkyl of 1 to 6 carbon atoms, lower alkoxy of 1 to 6 carbon atoms, halogen, nitro, and the like; imides such as

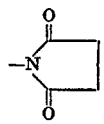

heterocyclics such as

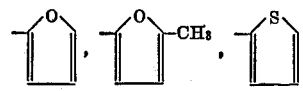

and the like; malonic acids; β-keto esters such as

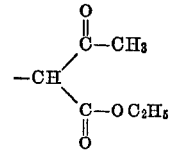

aliphatic, aryl or aralkyl 1,3-diketones such as

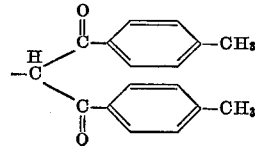

cycloaliphatic 1,3-diketones such as

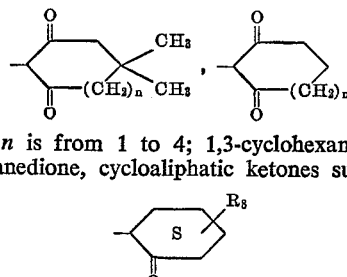

in which $n$ is from 1 to 4; 1,3-cyclohexanedione, 1,3-cyclopentanedione, cycloaliphatic ketones such as

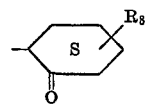

cyclopentanone, cyclohexanone, cycloheptanone and methylcyclohexanone; aliphatic ketone such as

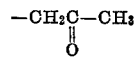

2-butanone, 2-pentanone, 2-hexanone and the like; 3-chloro-1-acetonyl such as

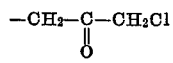

β-ketonitriles, ureas and thioureas,

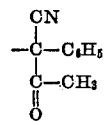

aryl ketones such as

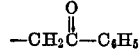

aralkyl ketones such as

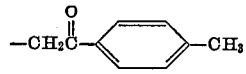

substituted phenols such as lower alkyl substituted phenols, nitro or halo substituted phenols and the like; aliphatic 1,2-diketones such as

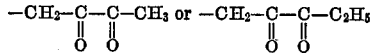

and cycloaliphatic 1,2-diketones such as 1,2-cyclohexanedione, 1,2-cyclopentanedione, 1,2-cycloheptanedione, 1,2-cyclooctanedione and the like; $R_3$ and $R_4$ each may be hydrogen, halogen such as chlorine, bromine, iodine and fluorine, staright or branched chain lower alkoxy of 1 to 6 carbon atoms, straight or branched chain lower alkyls of 1 to 6 carbons, carbamoyloxy such as

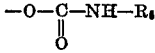

in which $R_6$ has the same significance as $R_1$ and nitro.

The symbols $R_1$, $R_2$, $R_3$, $R_4$, $R_5$, $R_6$, $R_7$ and $R_8$ used hereinafter have the same meaning as defined above.

Exemplary of the compounds of this invention are tabulated below:

TABLE I

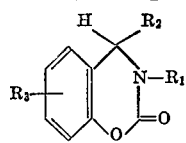

| | R₁ | R₂ | R₃ | M.P., °C. |
|---|---|---|---|---|
| 1 | CH₃ | —N(CH₃)CONHCH₃ | H | 156–157 |
| 2 | CH₃ | —NHCOOC₂H₅ | H | 167–168 |
| 3 | CH₃ | —NHCOOC₂H₅ | 6—Cl | *190–191 |
| 4 | CH₃ | —NHCOOC₂H₅ | 7—OCONHCH₃ | 182–18 |
| 5 | CH₃ | —NHCOOC₂H₅ | 8—OCH₃ | 166–167 |
| 6 | CH₂CH=CH₂ | —NHCOOC₂H₅ | H | 113–114 |
| 7 | CH₃ | —N(CH₃)COOC₂H₅ | H | 49.5–51 |
| 8 | CH₃ | —NHSO₂C₆H₅ | H | *203–204.5 |
| 9 | CH₃ | (succinimide) | H | 182–183 |
| 10 | CH₃ | (dimedone-like dione) | H | *196–197 |
| 11 | CH₃ | —CH₃COCHCOCH₃ | H | 136–138 |
| 12 | CH₃ | —CH₃COCHCOOC₂H₅ | H | 140–141 |
| 13 | CH₃ | —CH₃COCHCOC₆H₅ | H | *163–165 |
| 14 | CH₃ | —CH₂COCOCH₃ | H | *143–144.5 |
| 15 | CH₃ | —CHCOC—CN (φ) | H | 160–161 |
| 16 | CH₃ | —CH₂COCH₃ | H | 95–96.5 |
| 17 | CH₃ | —CH₂COCH₂Cl | H | *162–164 |
| 18 | CH₃ | —CH₂CO—C₆H₄—CH₃ | H | 153–154 |
| 19 | CH₃ | (cyclohexanone) | H | 151.5–153 |
| 20 | CH₃ | (furan) | H | 123–124 |
| 21 | CH₃ | (methylfuran) | H | 130–131.5 |
| 22 | CH₃ | (thiophene) | H | 136–137 |
| 23 | CH₃ | —C₆H₄—OH | H | 219–220 |
| 24 | CH₂CH=CH₂ | —NHCOOC₂H₅ | 6—Cl | *156–158 |
| 25 | CH₂CH=CH₂ | —NHCOOC₂H₅ | 7—OCONHCH₃ | 155.5–157 |
| 26 | CH₂CH=CH₂ | —NHCOOCH₂CH₂Cl | 8—OCH₃ | 127–128 |
| 27 | CH₃ | —N(CH₃)COOC₂H₅ | 6—Cl | 96–97 |
| 28 | CH₂CH=CH₂ | —N(CH₃)CONHCH₃ | H | 148–149 |
| 29 | CH₂CH=CH₂ | —NHCOOC₂H₅ | 8—OCH₃ | 127.5–129 |
| 30 | CH₃ | —NHCONH₂ | H | *202–201 |
| 31 | CH₃ | —OCH₃ | 8—OCH₃ | 88–90 |
| 32 | CH₃ | —OC₂H₅ | 8—OCH₃ | 69.5–71 |
| 33 | CH₃ | —OCH₂C₆H₅ | H | 95–96 |
| 34 | CH₂CH=CH₂ | —N(CH₃)CONHCH₃ | 6—Cl | 140–141 |
| 35 | CH₂CH=CH₂ | —N(CH₃)CONHCH₃ | 8—OCH₃ | 150–150 |
| 36 | CH₂COOC₂H₅ | —N(CH₃)CONHCH₃ | H | 139–143 |
| 37 | CH₃ | —NHCONHC₆H₅ | H | *194–195 |
| 38 | CH₃ | —NHCSNHCH₃ | H | *198–199 |
| 39 | CH₃ | —NHCSNHC₆H₅ | H | *203–204 |
| 40 | CH₃ | (decalindione) | 8—OCH₃ | 172–173 |
| 41 | CH₃ | (methylcyclopentanone) | H | 111–112 |
| 42 | CH₃ | (methylindole) | H | *175–176 |

TABLE I.—Continued

| | R₁ | R₂ | R₃ | M.P., °C. |
|---|---|---|---|---|
| 43 | CH₃ | 2-oxocyclohexyl | 6-Br | 161–162 |
| 44 | CH₃ | 2-methyl-2-oxocyclohexyl (with CH₃) | H | 142–143 |
| 45 | CH₃ | 1-oxo-1,2,3,4-tetrahydronaphthalen-2-yl | H | 181–182 |
| 46 | CH₃ | 2,6-dioxocyclohexyl | H | *177–178 |
| 47 | CH₃ | CH₃-C(OH)=C-C(O)-OC₂H₅ | 6-Cl | 149.5–151 |
| 48 | CH₃ | CH₃-C(OH)=C-C(O)-OC₂H₅ | 8-OCH₃ | 145–146 |
| 49 | CH₃ | CH₃-C(O)-CH-C(O)-OC₂H₅ | 8-OCH₃ | 100–101 |
| 50 | CH₃ | 2-methyl-2-oxocyclohexyl | 6-Br | *173–174 |
| 51 | CH₃ | 2-oxocyclopentyl | 6-Cl | 153–154 |
| 52 | thienyl(S) | CH₃-C(OH)=C-C(O)-OC₂H₅ | 6-Cl | 161–162 |
| 53 | thienyl(S) | —NHC(S)—NHCH₃ | 6-Cl | *194–195 |
| 54 | CH₃ | 2-oxo-2-(2-cyanoethyl)cyclohexyl | 6-Cl | 154–155 |
| 55 | CH₃ | 2,4-dioxothiazolidin-3-yl | H | *206–207 |
| 56 | CH₃ | 6-methoxy-1-oxo-1,2,3,4-tetrahydronaphthalen-2-yl | H | 160–161 |
| 57 | | R=CH₃-C(O)-CH-C(O)-OC₂H₅ | | 146–148 |
| 58 | | R=—CH₂COCH₃ | | 123–124 |

TABLE I.—Continued

| | R₁ | R₂ | R₃ | M.P., °C. |
|---|---|---|---|---|
| 59 | | R=O=⟨cyclohexyl⟩ | | 194–195 |
| 60 | | R=—N(CH₃)C(O)NHCH₃ | | 197–198 |
| 61 | | R=—NHC(S)NHCH₃ | | *203–204 |

*Melts with decomposition.

TABLE II

Applying the same reaction conditions as in Example 30, the following derivatives were prepared and characterized:

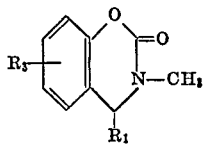

| | R₁ | R₃ | M.P., °C. |
|---|---|---|---|
| 62 | —NHCONH₂ | 8-OCH₃ | *216.5–218 |
| 63 | O=⟨ring⟩CH₃—N, —NHCONH | H | *269–270 |
| 64 | —NHCSNH₂ | H | *206–207 |
| 65 | —NHNHCSNH₂ | H | *212–213 |

*Melts with decomposition.

TABLE III

Following the procedure described in Example 32, the following compounds were prepared and characterized:

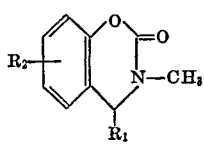

| | R₁ | R₂ | M.P., °C. |
|---|---|---|---|
| 66 | O=⟨ring⟩N—CH₃·HCl | H | *236–237 |
| 67 | O=⟨ring⟩N—CH₃ | 6-Br | 149.150 |
| 68 | O=⟨ring⟩N—CH₃ | 6-Cl | 140–141 |
| 69 | O=⟨ring⟩(CH₃)N—CH₃ | H | 170–171 |
| 70 | —NHCNH₂ (S) | 6-Br | *210–211 |
| 71 | —NHCNH₂ (S) | 6-Cl | ·213–214 |
| 72 | —NHCNH₂ (S) | H | 162–163 |

| | R₁ | R₂ | M.P., °C. |
|---|---|---|---|
| 73 | naphtho-oxazinone with piperidine (N-CH₃), C=O·HCl | | 241–242 |
| 74 | naphtho-oxazinone with piperidine N-benzoyl, =O | | 200–201 |

Melts with decomposition.

TABLE IV

Following the general procedure described in Example 33, the following compounds were prepared and characterized:

| | R₁ | R₂ | M.P., °C. |
|---|---|---|---|
| 75 | CH₂C(O)—OH | H | *202–203 |
| 76 | CH₂C(O)—OH | 6—Cl | *187–188 |
| 77 | —C(H)(C(O)—OH)—C(O)—OH | 6—Cl | *189–190 |
| 78 | —CH(CH₃)—C(O)—OH | 6—Br | *146–147 |
| 79 | —C(CH₃)(C(O)—OH)—C(O)—OH | 6—Br | *159–160 |
| 80 | naphtho-oxazinone, CH₂C(O)—OH | | *190–191 |

* Melts with decomposition.

The compounds of this invention exhibit anti-inflammatory activity and are to be used in accordance with the teachings set forth in O'Driscoll et al., Canadian Journal of Physiology and Pharmacology, vol. 42 (1964). Generally speaking, the compounds of this invention are useful in treating local inflammation. Among the local inflammatory conditions which the compounds of this invention are indicated are, for example, allergic and inflammatory dermatoses, pruritus, and bursitus.

In order to use these compounds to treat local inflammation in a mammalian host, such as mice, guinea pigs, dogs, cats and the like, they are administered orally or by topical application. For topical application of these compounds, from about 1 to 50% by weight are formulated with a dermatologically acceptable vehicle, such as white petrolatum, hydrophilic ointment and the like, and compounded by methods well known to the pharmaceutical art. These topical applications are applied liberally to the affected site 3 or 4 times daily. For oral administration, these compounds are combined with inert pharmaceutical excipients, such as mannitol, lactose, dicalcium phosphate and the like, and formulated into dosage forms well known to the pharmaceutical art, for example, tablets, capsules, etc. A dosage regimen of about 5 to 50 mg./kg. several times daily is generally recommended. This dosage regimen may, of course, be varied according to the age, sex, and severity of the condtion being treated by methods well known to the healing arts.

The compounds of this invention may also be combined with other known therapeutic agents, for example, steroids such as β-methasone, β-methasone-17-valerate, prednisolone, cortisone and the like, local anesthetics such as benzocaine and the like to enhance and broaden their therapeutic spectrum.

According to the process of this invention, the compounds are prepared by reacting compounds of the Formula II:

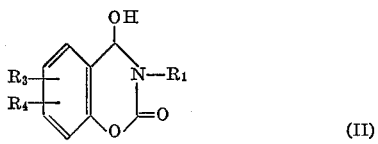

(II)

with any compound having an active hydrogen atom. Thus, they are reacted with a compound of the formula $R_2H$ wherein said active hydrogen is attached to the bond of, for example, $NH_2COOR_2$ or $H_2NSO_2C_6H_5$. The reaction is conducted in an inert solvent such as benzene, toluene, chloroform or tetrahydrofuran in the presence of an acidic catalyst such as p-toluenesulfonic acid; the reaction is effected by heating together the reactants in a suitable vessel. It is preferable, in some instances, to include in the reaction vessel provision for effecting simultaneous azeotropic distillation of the solvent to remove the water formed thereby expediting the completion of the reaction. A suitable device for water removal is a Dean-Stark trap. The desired reaction products are recovered by simply evaporating the reaction mixture to dryness and recrystallizing the product from a suitable solvent such as ethyl acetate, methanol, ethanol, cyclohexane and the like.

The starting materials used in the above reaction are prepared in accordance with directions given by R. E. Strube et al., Recueil 83 No. 9–10, p. 1191 (1964).

It has also been found that in carrying out this reaction, compound II itself reacts to form compounds of the Formula III:

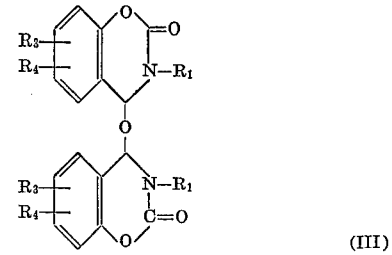

(III)

Compounds corresponding to (III) are not within the scope of this invention but will form the basis of a further application.

In order to further illustrate the invention, the following examples are given. All temperatures are given in degrees centigrade and room temperature is at 20 to 30° C.

EXAMPLE 1 (METHOD A)

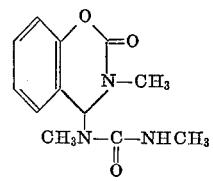

1-(3,4-Dihydro-3-methyl-2-oxo-2H-1,3-benzoxazin-4-yl)-1,3-dimethylurea

A solution of 8.0 g. of 3,4-dihydro-4-hydroxy-3-methyl-2H-1,3-benzoxazin-2-one, 4.3 g. of 1,3-dimethylurea, and 0.01 g. of p-toluenesulfonic acid monohydrate in 180 ml. of anhydrous benzene is refluxed for one half hour, while 0.8 ml. of water separates in the Dean-Stark trap. The solution is concentrated to about 80 ml. and, on cooling, 8.7 g. (83%) of 1-(3,4-dihydro-3-methyl-2-oxo-2H-1,3-benzoxazin-4-yl)-1,3-dimethylurea as white crystals is obtained, M.P. 154–156°. Recrystallization from ethyl acetate gives an analytically pure product, M.P. 156–157°; $\lambda_{max.}^{EtOH}$ mμ (ε) 267 (1,190), 274 (1,150); $\gamma_{max.}^{Nujol}$ 1230 (s), 1308 (s), 1540 (1626) (vs), 1736 (vs), 3320 (m) cm.$^{-1}$; $\gamma_{max.}^{CHCl_3}$ 1240–1200 (wide band, vs), 1298 (vs), 1396 (s), 1455 (vs), 1526 (vs), 1660–1632 (wide band, vs), 1734–1710 (wide band, vs), 2990 (m), 3380 (w), 3420 (w) cm.$^{-1}$.

Analysis.—Calc'd for $C_{12}H_{15}N_3O_3$ (percent): C, 57.82; H, 6.19; N, 16.86. Found (percent): C, 58.14; H, 6.19; N, 16.61.

EXAMPLE 1 (METHOD B)

A solution of 4.0 g. of 3,4-dihydro-4-hydroxy-3-methyl-2H-1,3-benzoxazin-2-one, 3.54 g. of methyl isocyanate and 5 drops of triethylamine in 30 ml. of tetrahydrofuran is allowed to stand at room temperature. After a period of three days, 1.8 g. of 1-(3,4-dihydro-3-methyl-2-oxo-2H-1,3-benzoxazine-4-yl)-1,3-dimethylurea as white crystals is obtained, m.p. 153–155°. The solvent is removed in vacuo at 30°, and the greenish residue is triturated with ethyl acetate to give an additional crop of 0.6 g. of white crystals, M.P. 152–155°. Recrystallization from ethyl acetate gives pure product, M.P. 156–157°. A mixed melting point with the analytical material obtained by Method A is not depressed.

EXAMPLE 2

Ethyl 3,4-dihydro-2-oxo-2H-1,3-benzoxazine-4-carbamate

A solution of 1.0 g. of 3,4-dihydro-4-hydroxy-3-methyl-2H-1,3-benzoxazin-2-one, 0.5 g. of ethyl carbamate, and 0.025 g. of p-toluenesulfonic acid monohydrate in 50 ml. of dry benzene is refluxed for one half hour, whereas 0.1 ml. of water is collected in the Dean-Stark trap. After the solvent is removed in vacuo, the residue is recrystallized from ethyl acetate to give 0.7 g. of ethyl 3,4-dihydro-2-oxo-2H-1,3-benzoxazine-4-carbamate as analytically pure, white, fluffy crystals, M.P. 167–168°;

$\lambda_{max.}^{EtOH}$ m$\mu$ ($\epsilon$) 267.5 (1,010), 274.5 (1970); $\gamma_{max.}^{Nujol}$ 761 (ms), 1035 (ms), 1236 (s), 1525 (ms), 1708 (vs), 1720 (s), 3290(m); $\gamma_{max.}^{CHCl_3}$ 1034 (s), 1240–1200 (wide band, vs), 1466 (s), 1502 (vs), 1740–1700 (wide band, vs), 2990 (m), 3300 (w), 3440 (m) cm.$^{-1}$.

*Analysis.*—Calc'd for $C_{12}H_{14}N_2O_4$ (percent): C, 57.59; H, 5.64; N, 11.20. Found (percent): C, 57.63; H, 5.69; N, 11.16.

EXAMPLE 3

Ethyl 6-chloro-3,4-dihydro-3-methyl-2-oxo-2H-1,3-benzoxazine-4-carbamate

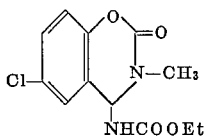

A solution of 8.0 g. of 6-chloro-3,4-dihydro-4-hydroxy-3-methyl-2H-1,3-benzoxazine-2-one, 3.2 g. of ethyl carbamate, and 0.02 g. of p-toluenesulfonic acid monohydrate in 250 ml. of chloroform is refluxed for 45 minutes, while 0.68 ml. of water is collected in the Dean-Stark trap. After the solvent is evaporated in vacuo, the white crystalline residue is recrystallized from ethanol to give 6.2 g. of analytically pure, shiny crystals, M.P. 191–192°. Concentration of the mother liquor to a low volume gives 3.3 g. of additional product, M.P. 190–191° (total yield: 91%);

$\lambda_{max.}^{EtOH}$ m$\mu$ ($\epsilon$) 224 (10,460), 276 (1,450), 284 (1,300); $\gamma_{max.}^{Nujol}$ 740 (ms), 832 (ms), 1031 (s), 1238 (s), 1513 (s), 1685 (vs), 1732 (vs), 3280 (ms) cm.$^{-1}$; $\gamma_{max.}^{CHCl_3}$ 814 (m), 1028 (s), 1240–1195 (wide band, vs), 1445 (s), 1488 (vs), 1708 (vs), 1720 (vs), 2940 (m), 3250 (w), 338 (m) cm$^{-1}$.

*Analysis.*—Calc'd for $C_{12}H_{13}ClNO_4$ (percent): C, 50.63; H, 4.60; N, 9.84; Cl, 12.45. Found (percent): C, 50.61; H, 4.75; N, 9.97; Cl, 12.51, 12.71.

EXAMPLE 4

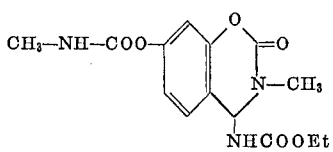

Ethyl 3,4-dihydro-3-methyl-7-[(methylcarbamoyl)oxy]-2-oxo-2H-1,3-benzoxazine-4-carbamate A solution of 12.6 g. of 3,4-dihydro-4-hydroxy-7-[(methylcarbamoyl)oxy]-3-methyl-2H-1, 3-benzoxazin-2-one, 4.5 g. of ethyl carbamate and 0.02 g. of p-toluenesulfonic acid monohydrate in 250 ml of chloroform is refluxed for two hours, while 0.9 ml. of water is collected in the Dean-Stark trap. The solvent is removed in vacuo and the residue is triturated with ethylene dichloride to give 8.5 g. of ethyl 3,4-dihydro-3-methyl-7-[(methylcarbamoyl)oxy]-2-oxo-2H-1,3-benzoxazine-4-carbamate as white crystals, m.p. 175–178°. To the filtrate is added 25 ml. of ether, heated briefly and cooled, to yield 2.7 g. of an additional crop, M.P. 146–147°. Recrystallization of the first crop from isopropanol gives 4.9 g. of analytically pure, white crystals, M.P. 182–183°;

$\lambda_{max.}^{EtOH}$ m$\mu$ ($\epsilon$) 215 sh (10,000), 268 (1,300), 275 (1,240); $\gamma_{max.}^{Nujol}$ 1035 (ms), 1074 (ms), 1253 (s), 1530 (ms), 1688 (s), 1725 (vs), 3280 (m), 3330 (m) cm.$^{-1}$; $\gamma_{max.}^{CHCl_3}$ 1027 (ms), 1154 (vs), 1240–1200 (wide band, vs), 1434 (s), 1500 (vs), 1610 (m), 1750–1700 (wide band, vs), 2970 (m), 3300 (w), 3440 (m), cm.$^{-1}$.

*Analysis.*—Calc'd for $C_{14}H_{17}N_3O_6$ (percent): C, 52.01; H, 5.30; N, 13.00. Found (percent): C, 52.00; H, 5.34; N, 13.20.

EXAMPLE 5

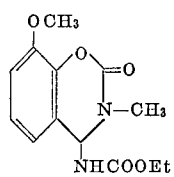

Ethyl 3,4-dihydro-8-methoxy-3-methyl-2-oxo-2H-benzoxazine-4-carbamate

A solution of 10.0 g. of 3,4-dihydro-4-hydroxy-8-methoxy-3-methyl-2H-1,3-benzoxazin-2-one, 4.5 g. of ethyl carbamate, and 0.02 g. of p-toluenesulfonic acid monohydrate in 200 ml. of anhydrous chloroform is refluxed for two hours with the azeotropical removal of water. After the solvent is removed in vacuo, the crystalline residue is recrystallized from isopropanol to give 9.3 g. of ethyl 3,4-dihydro-8-methoxy-3-methyl-2-oxo-2H-benzoxazine-4-carbamate as analytically pure, white crystals, M.P. 166–167°. Concentration of the mother liquor to a low volume and cooling yields 3.1 g. of an additional product, M.P. 165–166° (total yield: 92%);

$\lambda_{max.}^{EtOH}$ m$\mu$ ($\epsilon$) 22 (8,950), 274 (2,250), 280 (2,230); $\gamma_{max.}^{Nujol}$ 1132 (ms), 1210 (ms), 1234 (ms), 1250 (ms), 1493 (ms), 1510 (m), 1706 (s), 1720 (ms), 3280 (m) cm$^{-1}$; $\gamma_{max.}^{CHCl_3}$ 1028 (s), 1130 (ms), 1240–1200 (wide band, vs), 1270 (s), 1332 (ms), 1405 (ms), 1440 (s), 1493 (vs), 1630 (w), 1711 (vs), 1728 (vs), 2980 (m), 2280 (w), 3420 (m) cm.$^{-1}$.

*Analysis.*—Calc'd for $C_{13}H_{16}N_2O_5$ (percent): C, 55.71; H, 5.75; N, 10.00. Found (percent): C, 55.75; H, 5.80; N, 9.72.

EXAMPLE 6

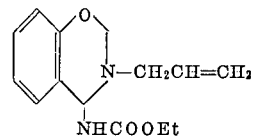

Ethyl 3-allyl-3,4-dihydro-2-oxo-2H-1,3-benzoxazine-4-carbamate

A solution of 10.0 g. of 3-allyl-3,4-dihydro-4-hydroxy-2H-1,3-benzoxazin-2-one, 4.35 g. of ethyl carbamate, and 0.02 g. p-toluene sulfonic acid monohydrate in 200 ml. of chloroform is refluxed for one hour, while 0.95 ml. of water is collected in the Dean Stark trap. After the solvent is removed in vacuo, the residue is recrystallized from cyclohexane-ethyl acetate (3:1) to give 8.1 g. of analytically pure, white crystals, M.P. 113–114°. Concentration of the mother liquor to a low volume gives 2.7 g. of additional product, M.P. 113–114° (total yield: 80%);

$\lambda_{max.}^{EtOH}$ mμ (ε) 277 (1,050), 274 (1,000); $\gamma_{max.}^{Nujol}$ 744 (m), 751 (ms), 1032 (ms), 1235 (s), 1340 (ms), 1503 (ms), 1520 (s), 1689 (vs), 1716 (vs), 3340 (m) cm.⁻¹; $\gamma_{max.}^{CHCl_3}$ 1060 (ms), 1225 (s), 1331 (ms), 1446 (ms), 1462 (s), 1500 (s), 1606 (m), 1643 (w), 2970 (w), 3410 (w), 3530 (w) cm.⁻¹.

Analysis.—Calc'd for $C_{14}H_{16}N_2O_2$ (percent): C, 60.86; H, 5.84; N, 10.14. Found (percent): C, 60.97; H, 5.84; N, 10.36.

EXAMPLE 7

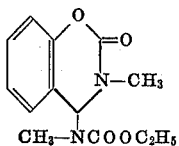

CH₃—NCOOC₂H₅

Ethyl 3,4-dihydro-N,3-dimethyl-2-oxo-2H-1,3-benzoxazine-4-carbamate

A solution of 8.0 g. of 3,4-dihydro-4-hydroxy-3-methyl-2H-1,3-benzoxazin-2-one, 5.06 g. of ethyl methylcarbamate and 0.02 g. of p-toluenesulfonic acid monohydrate in 180 ml. of anhydrous benzene was refluxed for one hour with the azeotropical removal of 0.75 ml. of water. The solvent was removed in vacuo to give a colorless, oily residue, which upon standing gave 4.2 g. of analytically pure, white crystals, M.P. 49.5–51°;

$\lambda_{max.}^{EtOH}$ mμ (ε) 267 (1,200), 274 (1,160); $\gamma_{max.}^{Nujol}$ 750 (ms), 762 (ms), 1150 (ms), 1234 (ms), 1310 (s), 1600 (m), 1690 (s), 1715 (s) cm.⁻¹; $\gamma_{max.}^{CHCl_3}$ 1250 (s), 1312 (s), 1394 (s), 1432 (s), 1466 (s), 1600 (m), 1690 (vs), 1728 (vs), 2970 (m) cm.⁻¹.

Analysis.—Calc'd for $C_{13}H_{16}N_2O_4$ (percent): C, 59.08; H, 6.10; N, 10.60. Found (percent): C, 59.15; H, 6.14; N, 10.36.

EXAMPLE 8

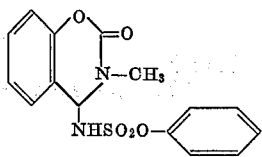

4-benzenesulfonamido-3,4-dihydro-3-methyl-2H-1,3-benzoxazin-2-one

A solution of 6.0 g. of 3,4-dihydro-4-hydroxy-3-methyl-2H-1,3-benzoxazin-2-one and 5.25 g. of benzenesulfonamide in 300 ml. of anyhdrous benzene is refluxed for two hours, whereas 0.60 ml. water is collected in a Dean-Stark trap. After cooling, the white crystals are filtered off to give 9.2 g. of 4-benzenesulfonamido-3,4-dihydro-3-methyl-2H-1,3-benzoxazin-2-one, M.P. 201–203°. Concentration of the filtrate to about 15 ml. and cooling gives an additional crop of 1.1 g. of white crystals, M.P. 201–203°; yield 97%. Recrystallization from ethyl acetate gives analytically pure, white crystals, M.P. 203–204.5°;

$\lambda_{max.}^{EtOH}$ mμ (ε) 215 (14,500), 260 sh (1,250), 265 (1,680), 272 (1,450); $\gamma_{max.}^{Nujol}$ 721 (ms), 750 (ms), 786 (m), 995 (ms), 1045 (m), 1150 (s) 1242 (s), 1310 (s), 1360 (ms), 1440 (s), 1695 (vs), 3200 (m) cm.⁻¹; $\gamma_{max.}^{CH_3CN}$ 1161 (s), 1200 (m), 1233 (s), 1735 (vs), 2900 (m), 3090 (m), 3580 (w) cm.⁻¹.

Analysis.—Calc'd for $C_{15}H_{14}N_2O_4S$ (percent): C, 56.59; H, 4.43; N, 8.80; S, 10.07. Found (percent): C, 56.50; H, 4.39; N, 8.91; S, 10.16, 10.03.

EXAMPLE 9

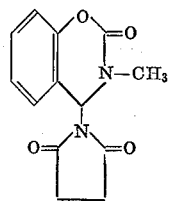

3,4-dihydro-3-methyl-4-(2,5-dioxo-1-pyrrolidinyl)-2H-1,3-benzoxazin-2-one

A solution of 5.37 g. of 3,4-dihydro-4-hydroxy-3-methyl-2H-1,3-benzoxazin-2-one, 3.0 g. of succinimide, and 0.03 g. of p-toluenesulfonic acid monohydrate is refluxed for one hour, while 0.50 ml. of water is collected in the Dean-Stark trap. The solution is filtered when hot and, after standing at room temperature for two days, 2.5 g. of 3,4-dihydro-3-methyl-4-(2,5-dioxo-1-pyrrolidinyl)-2H-1,3-benzoxazin-2-one as analytically pure, white crystals are obtained, M.P. 182–183°. Evaporation of the filtrate to dryness and recrystallization of the residue from ethyl acetate gives an additional crop of 3.3 g. of white crystals, M.P. 181–182°;

$\lambda_{max.}^{EtOH}$ mμ (ε) 213 inflection (8,400), 267 (1,200), 274.5 (1,200); $\gamma_{max.}^{Nujol}$ 742 (m), 1042 (m), 1097 (m), 1128 (m), 1178 (ms), 1208 (ms), 1238 (s), 1350 (ms), 1707 (s), 1723 (vs), 1774 (m), 3560 (w) cm.⁻¹. $\gamma_{max.}^{CHCl_3}$ 1040 (m), 1130 (ms), 1176 (s), 1245–1200 (wide band, vs), 1302 (s), 1313 (ms), 1346 (s), 1400–1378 (split, ms), 1466 (s), 1603 (m), 1740–1700 (wide band, vs), 1780 (m), 3990 (m), 3500 (w) cm.⁻¹.

Analysis.—Calc'd for $C_{13}H_{12}N_2O_4$ (percent): C, 59.99; H, 4.65; N, 10.77. Found (percent): C, 59.70; H, 4.92; N, 10.68.

EXAMPLE 10

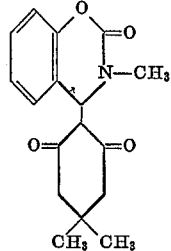

4-(4,4-dimethyl-2,6-dioxocyclohexyl)-3,4-dihydro-3-methyl-2H-1,3-benzoxazin-2-one A solution of 7.7 g. of 3,4-dihydro-4-hydroxy-3-methyl-2H-1,3-benzoxazin-2-one and 6.0 g. of dimedone in 250 ml. of anhydrous benzene is refluxed for one half hour, whereas 0.70 ml. of water is collected in the Dean-Stark trap. After cooling to room temperature and filtering, 12.3 g. of 4-(4,4-dimethyl-2,6-dioxocyclohexyl)-3,4-dihydro-3-methyl-2H-1,3-benzoxazin-2-one, M.P. 195–196°, decomp, are obtained. Concentration of the filtrate to a low volume and cooling gives 0.3 g. of an additional crop, M.P. 195–196°, total yield: 97%. Recrystallization from ethyl-acetate-ethanol (1:1) gives analytically pure, white crystals, M.P. 196–197°, dec.;

$\lambda_{max.}^{EtOH}$ mμ (ε) 261 (13,900), λ min 233 (5,000); $\gamma_{max.}^{Nujol}$ 740 (ms), 733 (m), 1038–1021 (split, s), 1126 (s), 1150 (s), 1200 (s), 1229 (vs), 1320 (s), 1342 (s), 1496 (m), 1546 (ms), 1600 (m), 1626 (m), 1722 (vs), 1920–1840 (wide band, m), 2600–2200 (wide band, m) cm.⁻¹; $\gamma_{max.}^{DMSO}$ 7600–7380 (wide band, vs), 1128 (m), 1202 (m), 1236 (vs), 1272 (m), 1372 (s), 1460–1400 (wide band, s), 1498 (m), 1625 (vs), 1723–1708 (vs), 2500 (ms), 2830 (ms), 3000 sh (m) cm.⁻¹.

Analysis.—Calc'd for $C_{14}H_{15}NO_4$ (percent): C, 64.36; H, 5.79; N, 5.36. Found (percent): C, 64.34; H, 5.91; N, 5.36.

EXAMPLE 11

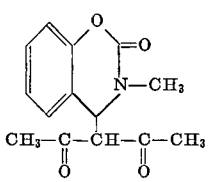

4-(2,4-dioxo-3-pentyl)-3,4-dihydro-3-methyl-
2H-1,3-benzoxazin-2-one

A solution of 9.0 g. of 3,4-dihydro-4-hydroxy-3-methyl-
2H-1,3-benzoxazin-2-one, 12 ml. of acetylacetone and
0.025 g. of p-toluenesulfonic acid monohydrate in 200 ml.
of anhydrous benzene is refluxed with provision for azeo-
tropical removal of water (0.9 ml.) for one and a half
hours. Concentration of the reaction to about 25 ml. and
cooling gives 10.6 g. of 4-(2,4-dioxo-3-pentyl)-3,4-dihy-
dro-3-methyl-2H-1,3-benzoxazin-2-one as white crystals,
M.P. 135–137°. Further concentration of the mother
liquor to about 8 ml. gives an additional crop of 1.3 g. of
off-white crystals, M.P. 134–136°, total yield: 92%. Re-
crystallization of the first crop from ethyl acetate gives
analytically pure, white crystals, M.P. 136–138°, $\lambda_{max.}^{EtOH}$ ($\epsilon$) 271 sh (5,000), 277 (5,250), 272–276 plateau
(4,800); $\lambda_{max.}^{EtOH/NaOH}$ 273–276 plateau (8,000), 279 (8,-
050), 288 (7,800; $\gamma_{max.}^{Nujol}$ 770 (s), 1032 (ms), 1138 (ms),
1180 (s), 1222 (s), 1258 (s), 1357 (ms), 1592 (m),
1608 (s), 1722 (vs), 1740 (s); $\gamma_{max.}^{CHCl_3}$ 1028 (ms), 1089
(ms), 1132 (ms), 1180 (s), 1230–1210 (wide band, vs),
1357 (s), 1398 (ms), 1460 (vs), 1493 (ms), 1740–1710
(wide band, vs), 2995 (m), 3600–3400 (wide band, w)
cm.$^{-1}$.

*Analysis.*—Calc'd for $C_{14}H_{15}NO_4$ (percent): C, 64.36;
H, 5.79; N, 6.36. Found (percent): C, 64.34; H, 5.91;
N, 5.27.

EXAMPLE 12

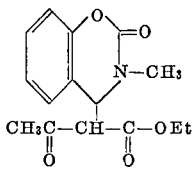

Ethyl 2-(3,4-dihydro-3-methyl-2-oxo-2H-1,3-benzo-
xazin-4-yl)acetoacetate

A solution of 8.0 g. of 3,4-dihydro-4-hydroxy-3-methyl-
2H-1,3-benzoxazin-2-one, 7.8 g. of ethyl acetoacetate and
0.05 g. of p-toluenesulfonic acid monohydrate in 200 ml.
of dry benzene is refluxed for two hours while 0.7 ml. of
water is collected in the Dean-Stark trap. The solvent is
removed in vacuo, the residue is triturated with hot cyclo-
hexane-ethyl acetate and cooled to give 11.3 g. of white
crystals, M.P. 139–140°. Concentration of the mother
liquor to a low volume gives an additional crop of 1.9 g.
of white crystals, M.P. 138–140°; total yield: 88%. Re-
crystallization from ethanol gives analytically pure, white
crystals, M.P. 140–141°;

$\lambda_{max.}^{EtOH}$ m$\mu$ ($\epsilon$) 251 (6,880); $\lambda_{max.}^{EtOH/NaOH}$ 275 (5,220);
$\gamma_{max.}^{Nujol}$ 759 (s), 850 (ms), 1011 (m), 1027 (m), 1060
(m), 1095 (m), 1202 (s), 1260–1220 (wide band, vs),
1400 (s), 1425 (s), 1496 (m), 1640–1595 (wide band,
vs) 1725 (vs); $\gamma_{max.}^{CHCl_3}$ 854 (wide band, m), 1025 (ms),
1054 (m), 1098 (ms), 1260–1195 (wide band, vs), 1290
(ms), 1402 (s), 1426 (s), 1460 (s), 1610 (s), 1640 (vs),
1730–1700 (wide band, vs), 3980 (m) cm.$^{-1}$.

*Analysis.*—Calc'd for $C_{15}H_{17}NO_5$ (percent): C, 61.85;
H, 5.88; N, 4.81. Found (percent): C, 61.85; H, 6.02;
N, 5.00.

EXAMPLE 13

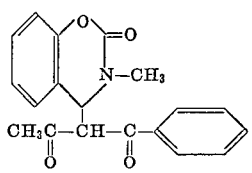

4-(1-acetylphenacyl)-3,4-dihydro-3-methyl-2H-1,3-
benzoxazin-2-one

A solution of 7.0 g. of 3,4-dihydro-4-hydroxy-3-methyl-
2H-1,3-benzoxazin-2-one, 6.3 g. of 1-phenyl-1,3-butane-
dione, and 0.02 g. of p-toluenesulfonic acid monohydrate
in 180 ml. of chloroform is refluxed for one and a half
hours, while 0.65 ml. of water is collected in the Dean-
Stark trap. The solvent is removed in vacuo. The color-
less semi-solid residue is crystallized from methanol to
give 5.3 g. of 4 - (1 - acetylphenacyl) - 3,4 - dihydro-
3 - methyl - 2H - 1,3 - benzoxazin - 2 - one as analyti-
cally pure white crystals, M.P. 163–165°, decomp. Con-
centration of the mother liquor to a low volume and
cooling gives an additional crop of 2.3 g. of white crystals,
M.P. 163–165°, decomp.;

$\lambda_{max.}^{EtOH}$ m$\mu$ ($\epsilon$) 253 (12,300), 290 sh (2,000); $\gamma_{max.}^{CHCl_3}$ 1462
(m), 1596 (w), 1678 (m), 1725 (vs) cm.$^{-1}$.

*Analysis.*—Calc'd for $C_{19}H_{17}NO_3$ (percent): C, 70.57;
H, 5.30; N, 4.33. Found (percent): C, 70.44; H, 5.40;
N, 4.55.

EXAMPLE 14

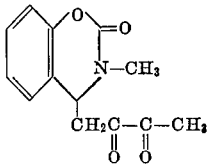

1-(3,4-dihydro-3-methyl-2-oxo-2H-1,3-benzoxazin-
4-yl)-2,3-butanedione

A solution of 5.0 g. of 3,4 - dihydro - 4 - hydroxy-3-
methyl - 2H - 1,3 - benzoxazin - 2 - one, 10.0 ml. of
diacetyl, and 0.02 g. of p-toluenesulfonic acid monohy-
drate in 150 ml. of anhydrous benzene is refluxed for
three hours, whereas 0.45 ml. of water is collected in
the Dean-Stark trap. The solvent is removed in vacuo
and the yellow-orange solid residue is crystallized from
ethanol to give 3.1 g. of 1 - (3,4 - dihydro - 3 - methyl-
2 - oxo - 2H - 1,3 - benzoxazin - 4 - yl) - 2,3 - butane-
dione as yellow crystals, M.P. 141–143°. Recrystalliza-
tion from ethanol gives 1.7 g. of analytically pure yellow
crystals, M.P. 143–144.5°;

$\lambda_{max.}^{EtOH}$ m$\mu$ ($\epsilon$) 267 (1,400); $\gamma_{max.}^{Nujol}$ 745 (m), 760 (m),
1210 (m), 1232 (ms), 1229 (s), 1708 (vs), 1727 (s)
cm.$^{-1}$; $\gamma_{max.}^{CHCl_3}$ 1240–1190 (wide band, s) 1260 (ms),
1405 (m), 1435 (m), 1462 (s), 1730–1710 (wide band,
s), 2990 (w) cm.$^{-1}$.

*Analysis.*—Calc'd for $C_{13}H_{13}NO_4$ (percent): C, 63.15;
H, 5.30; N, 5.67. Found (percent): C, 63.21; H, 5.59;
N, 5.57.

EXAMPLE 15

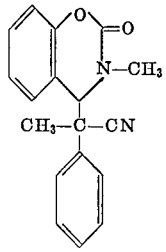

3,4-dihydro-3-methyl-4-(2-phenylacetonitril-2-yl)2H-
1,3-benzoxazin-2-one

A solution of 10.0 g. of 3,4 - dihydro - 4 - hydroxy-3-methyl - 2H - 1,3 - benzoxazin - 2 - one, 8.9 g. of 2- phenylacetonitrile, and 0.02 g. of p-toluenesulfonic acid monohydrate in 200 ml. benzene is refluxed for 2 hours, while 1.0 ml. of water is collected in the Dean-Stark trap. The solvent is removed in vacuo. The semisolid residue is refluxed with 200 ml. of ether for one hour and, on cooling, 14.2 g. of 3,4 - dihydro - 3 - methyl-4 - (2 - phenylacetonitril - 2 - yl)2H - 1,3 - benzoxazin-2-one as white crystals are obtained, M.P. 159–160°. Concentration of the mother liquor to a low volume gives an additional crop of 2.1 g. of white crystals, M.P. 157–159°; yield: 91%. Recrystallization from ether-ethanol (2:1) gives analytically pure product, M.P. 160–161°;

$\lambda_{max.}^{EtOH}$ m$\mu$($\epsilon$) 265.5 (15,650); $\gamma_{max.}^{Nujol}$ 690 (m), 735 (m), 752 (s), 1038 (m), 1226 (s), 1494 (m), 1713 (vs) cm$^{-1}$; $\gamma_{max.}^{CHCl_3}$ 690 (m), 1035 (m), 1195 (m), 1188 (s), 1230–1200 (s, wide band), 1395 (ms), 1450 (ms), 1465 (ms), 1494 (ms), 1740–1708 (vs, wide band), 3000 (m) cm.$^{-1}$.

*Analysis.*—Calc'd for $C_{19}H_{16}N_2O_3$ (percent): C, 71.24; H, 5.03; N, 8.75. Found (percent): C, 70.95; H, 5.32; N, 8.50.

EXAMPLE 16

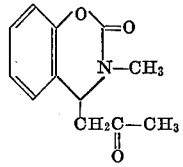

4-(1-acetonyl)-3,4-dihydro-3-methyl-2H-1,3-benzoxazin-2-one

A solution of 6.0 g. of 3,4 - dihydro - 4 - hydroxy-3-methyl - 2H - 1,3 - benzoxazin - 2 - one, 25 ml. of acetone, and 0.02 g. of p-toluenesulfonic acid monohydrate in 250 ml. of dry benzene is refluxed for two hours, while 0.6 ml. of water separates in the Dean-Stark trap. The solvent is evaporated and the residue is recrystallized from ethyl acetate to give 6.0 g. of 4 - (1 - acetonyl)-3,4 - dihydro - 3 - methyl - 2H - 1,3 - benzoxazin - 2 - one as pure, white crystals, M.P. 95–96.5°. Concentration of the mother liquor to a low volume gives an additional crop of 1.1 g. of white crystals (total yield: 86%), M.P. 94–96°;

$\lambda_{max.}^{ETOH}$ m$\mu$ ($\epsilon$) 267 (1,040); $\gamma_{max.}^{Nujol}$ 746 (m), 754 (ms), 1130 (m), 1240 (s), 1398 (m), 1442 (s), 1500 (m), 1600 (m), 1707 (vs) cm.$^{-1}$; $\gamma_{max.}^{CHCl_3}$ 1096 (m), 1160 (m), 1235–1190 (wide band, vs), 1363 (m), 1402 (ms), 1435 (ms), 1402 (s), 1712 (vs), 1725 (vs), 2990 (m) cm.$^{-1}$.

*Analysis.*—Calc'd for $C_{12}H_{13}NO_3$ (percent): C, 65.74; H, 5.98; N, 6.39. Found (percent): C, 65.72; H, 6.02; N, 6.47.

EXAMPLE 17

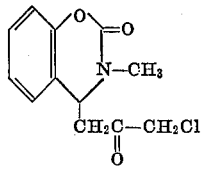

4(3-chloro-1-acetonyl)-3,4-dihydro-3-methyl-2H-1,3-benzoxazin-2-one

A solution of 15.0 g. of 3,4-dihydro-4-hydroxy-3-methyl-2H-1,3-benzoxazin-2-one, 10.0 g. of 2-chloropropanone, and 0.06 g. of p-toluenesulfonic acid monohydrate in 300 ml. of anhydrous benzene is heated for three hours, whereas 1.3 ml. of water is collected in the Dean-Stark trap. The solvent is removed in vacuo, and the residual yellow oil is triturated with 25 ml. of ethanol to give 4.9 g. of 4-(3 - chloro - 1-acetonyl)-3,4-dihydro-3-methyl-2H-1,3-benzoxazin-2-one as white crystals, M.P. 155–160°. Two recrystallizations from ethanol gives analytically pure white crystals, M.P. 162–164°, decomp.;

$\lambda_{max.}^{EtOH}$ m$\mu$($\epsilon$) 268 (1,040); $\gamma_{max.}^{Nujol}$ 757 (ms), 1233 (m), 1251 (ms), 1440 (ms), 1714 (vs), 1742 (s) cm.$^{-1}$; $\gamma_{max.}^{CHCl_3}$ 1230–1188 s, (wide band), 1401 (ms), 1434 (ms), 1461 (s), 1740–1710 (vs, wide band), 2980 (w) cm.$^{-1}$.

*Analysis.*—Calc'd for $C_{12}H_{12}ClNO_3$ (percent): C, 56.82; H, 4.77; N, 5.52; Cl, 13.98. Found (percent): C, 57.09; H, 4.92; N, 5.52; Cl, 13.95, 13.68.

EXAMPLE 18

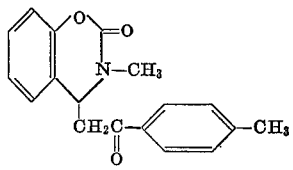

3,4-dihydro-3-methyl-4-(p-methylphenacyl)-2H-1,3-benzoxazin-2-one

A solution of 10.0 g. of 3,4-dihydro-4-hydroxy-3-methyl-2H-1,3-benzoxazin-2-one, 9.0 g. of p-methylacetophenone, and 0.02 g. of p-toluenesulfonic acid monohydrate in 250 ml. of dry benzene is refluxed for one and a half hours with the azeo-tropical removal of water (1.0 ml.). Concentration of the mother liquor to about 50 ml. and cooling gives 9.1 g. of 3,4-dihydro-3-methyl-4-(p-methylphenacyl) - 2H - 1,3 - benzoxazin-2-one as white crystals, M.P. 152–153°. The mother liquor is evaporated to dryness, taken up wtih 40 ml. of hot methanol and cooled to give 4.6 g. of white crystals, M.P. 151–152°, total yield: 88%. Recrystallization from methanol gives analytically pure product, M.P. 153–154°;

$\lambda_{max.}^{EtOH}$ m$\mu$ ($\epsilon$) 256.5 (16,700); $\gamma_{max.}^{Nujol}$ 754 (ms), 790 (m), 1234 (ms), 1430 (m), 1609 (m), 1677 (s), 1712 (vs) cm.$^{-1}$; $\gamma_{max.}^{CHCl_3}$ 1228 (s), 1403 (ms), 1436 (ms), 1461 (s), 1461 (s), 1609 (ms), 1682 (s), 1730–1710 (vs, wide band), 2980 (w) cm.$^{-1}$.

*Analysis.*—Calc'd for $C_{18}H_{17}NO_3$ (percent) C,73.20; H, 5.80; N, 4.74. Found (percent): C, 73.35; H, 5.91; N, 4.61.

EXAMPLE 19

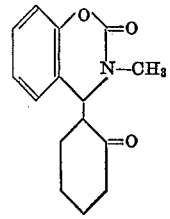

3,4-dihydro-3-methyl-2-oxo-2H-1,3-benzoxazin-4-(2-cyclohexanone)

A solution of 15.0 g. of 3,4-dihydro-4-hydroxy-3-methyl-2H-benzoxazin-2-one, 25 ml. of cyclohexanone, and 0.05 g. of p-toluenesulfonic acid monohydrate in 250 ml. dry benzene is refluxed for 40 minutes during which time 1.5 ml. of water is collected in the Dean-Stark trap. The solution is evaporated to dryness in vacuo, the residue is dissolved in 450 ml. of ether-Skelly B (1:1), and concentrated to about 200 ml. On standing at room temperature for five days, 15.7 g. of 3,4-dihydro-3-methyl-2-oxo-2H-1,3-benzoxazin-4-(2-cyclohexanone) as white crystals are obtained, M.P. 150–152°. Concentration of the filtrate to about 50 ml. and cooling gives an additional crop of 2.9 g. of white crystals, M.P. 149–152°, yield: 86%. Recrystallization from ethanol gives analytically pure, white crystals, M.P. 151.5–153°;

$\lambda_{max.}^{EtOH}$ m$\mu$ ($\epsilon$) 266.5 (1,020), 272.5 (960); $\gamma_{max.}^{Nujol}$ 760 (s), 1027 (m), 1120 (ms), 1196–1186 (split, ms), 1232–1221 (split, s), 1429 (ms), 1490 (m), 1705 (vs) cm.$^{-1}$; $\gamma_{max.}^{CHCl_3}$ 1022 (ms), 1093 (m), 1124 (ms), 1232–1185 (wide band, s), 1402 (m), 1430 (ms), 1459 (vs), 1490 (m), 1730–1695 (wide bands, vs), 2820 (m), 2900 (m), 3420 (w), cm.$^{-1}$.

Analysis.—Calc'd for $C_{15}H_{17}NO_3$ (percent): C, 69.48; H, 6.61; N, 5.40. Found (percent): C, 69.56; H, 6.81; N, 5.16.

EXAMPLE 20

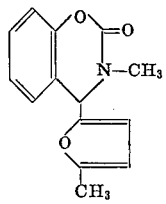

3,4-dihydro-3-methyl-2-oxo-2H-1,3-benzoxazin-4-(2-benzoxazin-2-one

A solution of 20.0 g. of 3,4-dihydro-4-hydroxy-3-methyl-2H-1,3-benzoxabin-2-one, 30 ml. of 2-methyl furan, and 0.2 g. of p-toluenesulfonic acid monohydrate is refluxed for one hour, while 2.0 ml. of water is collected in the Dean-Stark trap. The solvent is removed in vacuo and the residue is recrystallized from ethanol to give 19.0 g. of 3,4-dihydro-4-(5 - methyl - 2 - furyl)-3-methyl-2H-1,3-benzoxazin-2-one as analytically pure, white, shiny needles, M.P. 130–131.5°. Concentration of the mother liquor to a low volume gives 5.4 g. of an additional white product, M.P. 129–131°, total yield: 90%;

$\lambda_{max.}^{EtOH}$ m$\mu$($\epsilon$) 221 (6,500), 267 (500), 275 (460); $\gamma_{max.}^{Nujol}$ 741 (m), 760 (ms), 1225 (ms), 1242 (m), 1397 (m), 1572 (m), 1601 (m), 1670 (m), 1708 (vs) cm.$^{-1}$; $\gamma_{max.}^{CHCl_3}$ 1019 (m), 1098 (m), 1127 (m), 1190 (ms), 1238–1200 (wide band vs), 1397 (ms) 1430 (ms), 1462 (s), 1494 (m), 1603 (m), 1621 (w), 1703–1700 (wide band, vs), 2980 (w) cm.$^{-1}$.

Analysis.—Calc'd for $C_{14}H_{13}NO_3$ (percent): C, 69.12; H, 5.39; N, 5.76. Found (percent): C, 69.24; H, 5.42; N, 5.59.

EXAMPLE 21

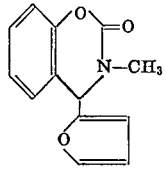

3,4-dihydro-4-(2-furyl)-3-methyl-2H-1,3-benzoxazin-2-one

The reaction is carried out in the same way as with 2-methyl furan (Example 20) except that the ethyl acetate is used as a recrystallization solvent. Thus, the mixture of 15 g. of 3,4-dihydro-4-hydroxy-3-methyl-2H-1,3-benzoxazin-2-one, 25 ml. of furan, and 0.025 g. of p-toluenesulfonic acid monohydrate in 250 ml. of dry benzene gives 18.0 g. (94% yield) of 3,4-dihydro-4-(2-furyl)-3-methyl-2H-1,3-benzoxazin-2-one as white crystals, M.P. 123–124°;

$\lambda_{max.}^{EtOH}$ m$\mu$ ($\epsilon$) 218 (15,600), 267 (1,000), 273.5 (950); $\gamma_{max.}^{Nujol}$ 739 (s), 757 (s), 934 (m), 1000 (ms), 1032 (m), 1150 (ms), 1240–1221 (triplet, s), 1394 (ms), 1430 (ms), 1495 (m), 1506 (m), 1602 (ms), 1668 (m), 1703 (vs) cm$^{-1}$; $\gamma_{max.}^{CHCl_3}$ 932 (m), 1006 (ms), 1025 (m), 1095 (ms), 1185 (ms), 1235–1195 (wide band, vs), 1396 (s), 1429 (s), 1494 (m), 1602 (m), 1710 (vs), 2980 (m) cm.$^{-1}$.

Analysis.—Calc'd for $C_{13}H_{11}NO_3$ (percent): C, 68.11; H, 4.84; N, 6.11. Found (percent): C, 68.38; H, 5.02; N, 6.16.

EXAMPLE 22

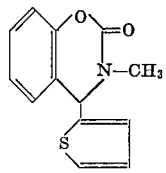

3,4-dihydro-3-methyl-4-(2-thienyl)-2H-1,3-benzoxazin-2-one

A solution of 10.0 g. of 3,4-dihydro-4-hydroxy-3-methyl-2H-1,3-benzoxazin-2-one, 40 ml. of thiophene and 0.02 g. of p-toluenesulfonic acid monohydrate in 200 ml. of dry benzene is refluxed for 90 minutes with the azeotropical removal of water (1.0 ml.). After the evaporation to dryness in vacuo, the crystalline residue is triturated with ethanol to give 11.2 g. of 3,4-dihydro-3-methyl-4-(2-thienyl)-2H-1,3-benzoxazin-2-one as nearly white crystals, M.P. 135–136°. Recrystallization from ethanol gives analytically pure, white-pinkish crystals, M.P. 136–137°;

$\lambda_{max.}^{EtOH}$ m$\mu$ ($\epsilon$) 227 (10,700); 263–267.5 plateau (1,200), 275 (1,000); $\gamma_{max.}^{Nujol}$ 707 (s), 741 (s), 750 (s), 760 (s), 854 (m), 1241 (ms), 1491 (m), 1595 (ms), 1663 (m), 1710–1690 wide band, vs) cm.$^{-1}$; $\gamma_{max.}^{CHCl_3}$ 1235–1188 (wide band, s), 1395 (ms), 1428 (ms), 1456 (s), 1490 (m), 1599 (ms), 1619 (w), 1709 (vs), 1720 (vs), 2960 (m) cm.$^{-1}$.

Analysis.—Calc'd for $C_{13}H_{11}NO_2S$ (percent): C, 63.65; H, 4.52; N, 5.71; S, 13.07. Found (percent): C, 63.91; H, 4.57; N, 5.83; S, 13.16, 13.05.

EXAMPLE 23

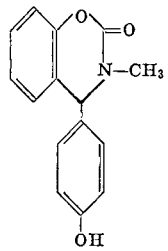

3,4-dihydro-4-(p-hydroxyphenyl)-3-methyl-2H-1,3-benzoxazin-2-one

A solution of 8.0 g. of 3,4-dihydro-4-hydroxy-3-methyl-2H-1,3-benzoxazin-2-one, 4.2 g. of phenol, and 0.02 g. of p-toluenesulfonic acid monohydrate in 200 ml. of dry chloroform is refluxed for two hours, while 0.8 ml. of water is collected in the Dean-Stark trap. Concentration of the solution to about 25 ml. and cooling gives 7.6 g. of 3,4-dihydro-4-(p-hydroxyphenyl)-3-methyl-2H-1,3 - benzoxazin-2-one as white crystals, M.P. 213–215°. Recrystallization from methanol gives analytically pure, shiny crystals, M.P. 219–220°;

$\lambda_{max.}^{EtOH}$ mμ (ε) 231 (13,450), 269 (2,320), 276 (2,520), 284 sh (1,440); $\gamma_{max.}^{Nujol}$ 738 (ms), 818 (m), 1222 (s), 1518 (m), 1596 (ms), 1615 (m), 1680 (vs), 3120 (m) cm.$^{-1}$; $\gamma_{max.}^{DMSO}$ 754 (ms), 825 (m), 1196 (ms), 1220 (vs), 1510 (ms), 1394 (ms), 1010 (m), 1720 (vs), 3100–2750 (wide band, m), 3420 (ms) cm.$^{-1}$.

*Analysis.*—Calc'd for $C_{15}H_{13}NO_3$ (percent): C, 70.58; H, 5.13; N, 5.49. Found (percent): C, 70.88; H, 5.34; N, 5.21.

EXAMPLE 24

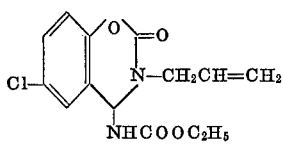

Ethyl 3-allyl-6-chloro-3,4-dihydro-2-oxo-2H-1,3-benz-oxazine-4-carbamate

A solution of 10.0 g. of 3-allyl-6-chloro-3,4-dihydro-4-hydroxy-2H-1,3-benzoxazin-2-one, 3.7 g. of ethyl carbamate and 0.01 g. of p-toluenesulfonic acid monohydrate in 200 ml. of dry benzene is refluxed for one hour, while 0.75 ml. of water is collected in the Dean-Stark trap. Concentration of the solution to about 25 ml. and cooling gives 11.5 g. (89%) of ethyl 3-allyl-6-chloro-3,4-dihydro - 2-oxo-2H-1,3-benzoazine-4 - carbamate as white crystals, M.P. 155–157°. Recrystallization from methanol gives analytically pure, shiny needles, M.P. 156–158°;

$\lambda_{max.}^{EtOH}$ mμ (ε) 218 (9,600), 224.5 (9,840), 248–262 plateau (760), 276 (1,280), 284 (1,200); $\gamma_{max.}^{Nujol}$ 3340 (w), 1720 (s), 1686 (s), 1508 (ms), 1232 (s), 833 (m) cm.$^{-1}$.

*Analysis.*—Calc'd for $C_{14}H_{15}ClN_2O_4$ (percent): C, 54.11; H, 4.87; N, 9.01; Cl, 11.41. Found (percent): C, 54.35; H, 4.97; N, 8.82; Cl, 11.38, 11.48.

EXAMPLE 25

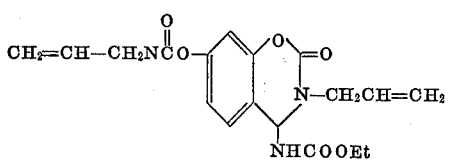

Ethyl 3-allyl-7-[(allylcarbamoyl)oxy]-1,3-dihydro-2-oxo-2H-1,3-benzoxazine-4-carbamate A solution of 7.0 g. of 3-allyl-3,4-dihydro-4,7-dihydroxy-2H-1,3-benzoxazin-2-one 7-carbamate, 2.2 g. of ethyl carbamate and 0.01 g. of p-toluenesulfonic acid monohydrate in 100 ml. of dry chloroform is refluxed for one hour with the azeotropical removal of 0.4 ml. of water. The solvent is evaporated in vacuo and the residue is crystallized from ether to give 7.1 g. (83%) of pinkish colored crystals, M.P. 153–155°. Recrystallization from ethyl acetate gives analytically pure, white crystals, M.P. 155.5–157°;

$\lambda_{max.}^{EtOH}$ mμ (ε) $\gamma_{max.}^{Nujol}$ 1155 (s), 1240 (vs), 1534 (s), 1681 (vs) 1713 (vs), 1740 (vs), 3290 (m) cm.$^{-1}$.

*Analysis.*—Calc'd for $C_{18}N_{21}N_3O_6$ (percent): C, 57.59; H, 5.64; N, 10.20. Found (percent): C, 57.88; H, 5.78; N, 10.35.

EXAMPLE 26

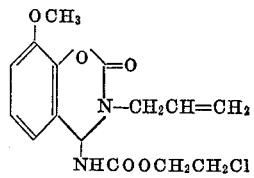

β-Chloroethyl-3-allyl-3,4-dihydro-methoxy-2-oxo-2H-1,3-benzoxazine-4-carbamate

A solution of 8.0 g. of 3-allyl-3,4-dihydro-4-hydroxy-8-methoxy-2-oxo-2H-1,3-benzoxazin-2-one, 4.2 g. of β-chloroethyl carbamate, and 0.01 g. of p-toluenesulfonic acid monohydrate in 150 ml. of dry chloroform is refluxed for one hour, while 0.6 ml. of water is collected in the Dean-Stark trap. Evaporation of the solvent and trituration with ethyl acetate gives 9.3 g. (80%) of white crystals, M.P. 126–128°. Recrystallization from ethyl acetate yields analytically pure product, M.P. 127–128°;

$\lambda_{max.}^{EtOH}$ mμ (ε) 221 (9,200), 271 (2,200), 279 (2,200); $\gamma_{max.}^{Nujol}$ 1215 (ms), 1254 (s), 1494 (ms), 1535 (m), 1688 (vs), 1725 (s), 3290 (m) cm.$^{-1}$.

*Analysis.*—Calc'd for: $C_{15}H_{17}ClN_2O_5$ (percent): C, 52.87; H, 5.03; N, 8.22; Cl, 10.40. Found (percent): C, 53.16; H, 4.98; N, 8.06; Cl, 10.16, 10.54.

EXAMPLE 27

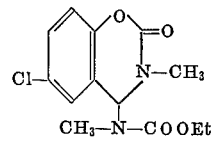

Ethyl 6-chloro-3,4-dihydro-3,N-dimethyl-2-oxo-2H-1,3-benzoxazine-4-carbamate

A solution of 6-chloro-3,4-dihydro-4-hydroxy-3-methyl-1,3-benzoxazin-2-one, 2.4 g. of ethyl methylcarbamate, and 0.1 g. of p-toluenesulfonic acid monohydrate in 100 ml. of anhydrous benzene is refluxed for one and a half hours with the azeotropical removal of 0.37 ml. of water. The solvent is removed in vacuo. Trituration with 2.0 ml. of hot cyclohexane gives 4.8 g. of white crystals, M.P. 94–95°. Recrystallization from cyclohexane yields 3.7 g. of analytically pure crystals, M.P. 96–97°;

$\lambda_{max.}^{EtOH}$: 224 (21,800), 277 (2,800), 285 (2,450); $\gamma_{max.}^{Nujol}$ 821 (m), 1158 (ms), 1231 (s), 1313 (s), 1381 (ms), 1694 (vs), 1740 (s) cm.$^{-1}$.

*Analysis.*—Calc'd for $C_{13}H_{15}ClN_2O_4$ (percent): C, 52.27; H, 5.06; N, 9.38; Cl, 11.87. Found (percent): C, 52.45; H, 5.01; N, 9.40; Cl, 12.00, 11.73.

EXAMPLE 28

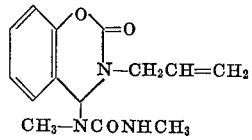

1-(3-allyl-3,4-dihydro-2-oxo-2H-1,3-benzoxazin-4-yl)-1,3-dimethylurea

A solution of 7.5 g. of 3-allyl-6-chloro-3,4-dihydro-4-hydroxy-2H-1,3-benzoxazin-2-one, 3.7 g. of 1,3-dimethylurea, and 0.01 g. of p-toluenesulfonic acid monohydrate in 150 ml. of dry benzene is refluxed for one hour, while 0.64 ml. of water is collected in the Dean-Stark trap. After the solvent is removed in vacuo, the residue is triturated with 8 ml. of ethyl acetate to give 8.5 g. of white crystalline product, M.P. 147–148°. Recrystallization from ethyl acetate gives analytically pure white crystals, M.P. 148–149°;

$\lambda_{max.}^{EtOH}$ m$\mu$ ($\epsilon$) 267 (1,100), 273 (1,100); $\gamma_{max.}^{Nujol}$ 1206 (ms), 1310 (ms), 1460 (ms), 1546 (ms), 1625 (s), 1726 (s), 3320 (m) cm.$^{-1}$.

*Analysis.*— Calc'd for $C_{14}H_{17}N_3O_3$ (percent): C, 61.08; H, 6.22; N, 15.26. Found (percent): C, 61.18; H, 6.27; N, 15.20.

EXAMPLE 29

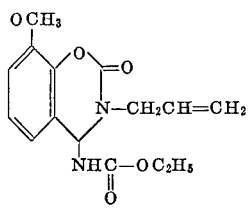

Ethyl 3-allyl-3,4-dihydro-8-methoxy-2-oxo-2H-1,3-benzoxazine-4-carbamate

A solution of 10.0 g. of 3-allyl-3,4-dihydro-4-hydroxy-8-methoxy-2H-1,3-benzoxazin-2-one, 3.8 g. of ethyl carbamate and 0.01 g. of p-toluenesulfonic acid monohydrate in 150 ml. of dry chloroform is refluxed for one and a half hours, while 0.75 ml. of water separates in the Dean-Stark trap. After the solvent is removed in vacuo, the semi-solid residue is recyrstallized from ethyl acetate to give 4.8 g. of analytically pure, white crystals, M.P. 127.5–129°. Concentration of the mother liquor to a low volume and addition of a small amount of hot cyclohexane gives 4.2 g. of an additional material, M.P. 127–128.5° (total yield: 69%);

$\lambda_{max.}^{EtOH}$ m$\mu$ ($\epsilon$) 221 (8,950), 272 (2,050), 279 (2,050); $\gamma_{max.}^{Nujol}$ 1213 (s) 1241 (s), 1498 (s), 1531 (ms), 1627 (w), 1687 (vs), 1706 (ms), 1735 (s), 3290 (m) cm.$^{-1}$.

*Analysis.*—Calc'd for $C_{15}H_{17}N_2O_5$ (percent): C, 58.81; H, 5.92; N, 9.15. Found (percent): C, 58.55; H, 5.96; N, 9.11.

EXAMPLE 30

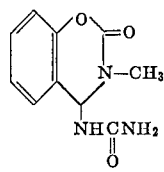

1-(3,4-dihydro-3-methyl-2-oxo-2H-benzoxazin)urea

To a solution of 5.0 g. of 3,4-dihydro-4-hydroxy-3-methyl-2H-1,3-benzoxazin-2-one and 2.5 g. of urea in 80 ml. of absolute ethanol is added five drops of ethanolic hydrogen chloride at room temperature. The white crystals begin to separate soon and, after five hours, 5.4 g. (88%) of product is filtered off, M.P. 202–203°, decomp. Recrystallization from ethanol gives analytically pure crystals, M.P. 203–204°, decomp.

*Analysis.*—Calc'd for $C_{10}H_{11}N_3O_3$ (percent): C, 54.29; H, 5.01; N, 19.00. Found (percent): C, 54.18; H, 5.28; N, 19.25.

EXAMPLE 31

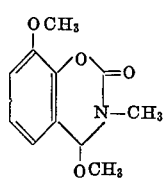

3,4-dihydro-4,8-dimethoxy-3-methyl-2H-1,3-benzoxazin-2-one 2,4 - dihydro - 4-hydroxy-8-methoxy-3-methyl-2H-1,3-benzoxazin-2-one (8.0 g.) in 80 ml. of absolute methanol is refluxed for seventy hours. Concentration to ca. 10 ml. and cooling gives 6.3 of white crystals, M.P. 88–90°. Recrystallization from ethanol gives analytically pure product, M.P. 88–90°;

$\lambda_{max.}^{EtOH}$ m$\mu$ ($\epsilon$) 223 (5,850), 273 (1,730), 280 (1,680); $\gamma_{max.}^{Nujol}$ 1055 (ms,) 1130 (ms), 1211 (ms), 1492 (ms), 1712 (s) cm.$^{-1}$.

*Analysis.*—Calc'd for $C_{11}H_{13}NO_4$ (percent): C, 59.18; H, 5.87; N, 6.28. Found (percent): C, 59.49, 59.39; H, 5.89, 6.02; N, 6.41, 6.39.

EXAMPLE 32

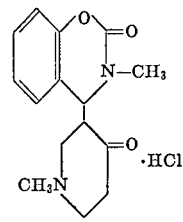

3,4-dihydro-3-methyl-4-(1-methyl-4-oxo-3-piperidyl)-2H-1,3-benzoxazin-2-one

To a solution of 8.0 g. of 3,4-hiydro-4-hydroxy-3-methyl-2H-1,3-benzoxazin-2-one and 5.0 g. of N-methyl-4-piperidone in 50 ml. of anhydrous dimethylformamide was introduced dry hydrogen chloride to pH 2.0 at 25°. After two days at room temperature, 5.1 g. of white crystals, M.P. 232°, dec., was separated by filtration. The filtrate was evaporated in vacuo at 30°, and residue was crystallized from acetonitrile-methanol (3:1) to give 3.9 g. of white product, M.P. 236–237°, dec. Recrystallization from acetonitrile gave analytically pure crystals, M.P. 237–238°, dec.;

$\lambda_{max.}^{EtOH}$ m$\mu$ ($\epsilon$) 266 (1000), 273 (900); $\gamma_{max.}^{Nujol}$ 2420 (m, salt) 1730 sh, 1723 (C=O, vs) cm.$^{-1}$.

*Analysis.*—Calc'd for $C_{15}H_{18}N_2O_3 \cdot HCl$ (percent): C, 57.97; H, 6.16; N, 9.01; Cl, 11.41. Found (percent): C, 58.12; H, 6.22; N, 8.87; Cl, 11.32.

EXAMPLE 33

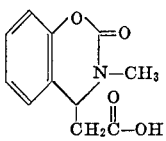

3,4-dihydro-3-methyl-2-oxo-2H-1,3-benzoxazin-4-acetic acid

To a solution of 2.7 g. (0.015 mole) of 3,4-dihydro-4-hydroxy-2H-1,3-benzoxazin-2-one and 1.9 g. (0.0183 mole) of malonic acid in 25 ml. of dry tetrahydrofuran was introduced dry hydrogen chloride to pH 1.0 at 55°. The solvent was removed and the residue was triturated with 10 ml. of acetonitrile to give 3.0 g. of white crystals, M.P. 200–201°, dec. Recrystallization from acetonitrile gave an analytically pure product, M.P. 202–203°, dec.;

$\lambda_{max.}^{EtOH}$ m$\mu$ ($\epsilon$) 267 (1000), 275 sh (840); $\gamma_{max.}^{Nujol}$ 1732 (C=O, vs), 1670 (C=O, vs) cm.$^{-1}$.

*Analysis.*—Calc'd for $C_{11}H_{11}NO_4$ (percent): C, 59.86; H, 5.06; N, 6.48. Found (percent): C, 59.72; H, 5.01; N, 6.33.

It is understood that the foregoing detailed description is given merely by way of illustration and that many variations may be made without departing from the spirit of our invention.

Having described our invention, what we desire to secure by Letters Patent is:

1. 3-allyl - 6 - chloro-4-(1,3-dimethylureido)-3,4-dihydro-2H-1,3-benzoxazin-2-one.

2. 3-allyl - 4 - (1,3-dimethylureido) - 3,4 - dihydro-8-methoxy-2H-1,3-benzoxazin-2-one.

3. Ethyl 3,4-dihydro-4-(1,3-dimethylureido)-2-oxo-2H-1,3-benzoxazin-3-acetate.
4. 3,4-dihydro - 3 - methyl-4-(3-phenylureido)-2H-1,3-benzoxazin-2-one.
5. 3,4-dihydro-3-methyl-4-(3 - methyl - 2 - thioureido)-2H-1,3-benzoxazin-2-one.
6. 3,4-dihydro-3-methyl-4-(3-phenyl - 2 - thioureido)-2H-1,3-benzoxazin-2-one.
7. 3,4-dihydro-8-methoxy - 3 - methyl-4-(2-oxo-cyclododecyl)-2H-1,3-benzoxazine-2-one.
8. 3,4-dihydro-3-methyl - 4 - (2 - oxocyclopentyl)-2H-1,3-benzoxazin-2-one.
9. 3,4-dihydro - 3 - methyl-4-(2 - methylindol-3-yl)-2H-1,3-benzoxazin-2-one.
10. 6-bromo-3,4-dihydro - 3 - methyl-4-(2-oxo-cyclohexyl)-2H-1,3-benzoxazin-2-one.
11. 3,4-dihydro - 3 - methyl-4-(3-methyl-2-oxo-cyclohexyl)-2H-1,3-benzoxazin-2-one.
12. 3,4-dihydro - 3 - methyl-4-(1,2,3,4-tetrahydro-1-oxo-2-naphthyl)-2H-1,3-benzoxazin-2-one.
13. 4-(2,3-dioxocyclohexyl) - 3,4 - dihydro-3-methyl-2H-1,3-benzoxazin-2-one.
14. Ethyl 6-chloro - 3,4 - dihydro-$\alpha$-(1-hydroxyethylidene)-3-methyl-2-oxo-2H-1,3-benzoxazin-4-acetate.
15. Ethyl 3,4-dihydro - $\alpha$ - (1-hydroxyethylidene-8-methoxy-3-methyl-2-oxo-1,3-benzoxazin-4-acetate.
16. Ethyl $\alpha$-acetyl - 3,4 - dihydro-8-methoxy-3-methyl-2-oxo-2H-1,3-benzoxazin-4-acetate.
17. 6-bromo - 3,4 - dihydro-3-methyl-4-(3-methyl-2-oxocyclohexyl)-2H-1,3-benzoxazin-2-one.
18. 6-chloro - 3,4 - dihydro-3-methyl-4-(2-oxocyclopentyl)-2H-1,3-benzoxazin-2-one.
19. Ethyl 6-chloro - 3 - cyclohexyl-3,4-dihydro-$\alpha$-(1-hydroxyethylidene)-2-oxo-2H-1,3-benzoxazin-4-acetate.
20. 6-chloro - 3 - cyclohexyl-3,4-dihydro-4-(3-methyl-2-thioureido-2H-1,3-benzoxazin-2-one).
21. 6-chloro - 4 - [3-(2-cyanoethyl)-2-oxocyclohexyl]-3,4-dihydro-3-methyl-2H-1,3-benzoxazin-2-one.
22. 3,4-dihydro - 3 - methyl-4-(4-oxo - 2 - thioxo-3-thiazolidinyl)-2H-1,3-benzoxazin-2-one.
23. 3,4-dihydro - 3 - methyl-4-(1,2,3,4 - tetrahydro-6-methoxy-1-oxo-2-naphthyl)-2H-1,3-benzoxazin-2-one.
24. Ethyl $\alpha$-acetyl - 2,3 - dihydro - 2 - methyl-3-oxo-1H-naphth-[1,2-e][1,3]oxazin-1-acetate.
25. 1-acetonyl - 2 - methyl - 1H - naphth[1,2-e][1,3]oxazin-3(2H)-one.
26. 2-methyl - 1 - (2-oxocyclohexyl)-1H-naphtha[1,2-e][1,3]oxazin-3(2H)-one.
27. 2-methyl - 1 - (3-methylureido)-1H-naphth[1,2-e][1,3]oxazin-3(2H)-one.
28. 2-methyl - 1 - (3-methyl-2-thioureido)-1H-naphth[1,2-e][1,3]oxazin-3(2H)-one.

29. 3,4-dihydro - 8 - methoxy - 3 - methyl-4-ureido-2H-1,3-benzoxazin-2-one.
30. 4,4' - ureylenebis[3,4 - dihydro-3-methyl-2H-1,3-benzoxazin-2-one].
31. 3,4 - dihydro - 3 - methyl - 4 - (2-thioureido)-2H-1,3-benozxazin-2-one.
32. 3,4-dihydro - 3 - methyl-4-(3 - thiosemicarbazido)-2H-1,3-benzoxazin-2-one.
33. 3,4-dihydro - 3 - methyl-4-(1 - methyl-4-oxo-3-piperidyl)-2H-1,3-benzoxazin-2-one.
34. 6-bromo - 3,4 - dihydro-3-methyl - 4 - (1-methyl-4-oxo-3-piperidyl)-2H-1,3-benzoxazin-2-one.
35. 6-chloro-3,4-dihydro - 3 - methyl - 4 - (1-methyl-4-oxo-3-piperidyl)-2H-1,3-benzoxazin-2-one.
36. 4-(1,3-dimethyl - 4 - oxo - 3 - piperidyl)-3,4-dihydro-3-methyl-2H-1,3-benzoxazin-2-one.
37. 6-bromo - 3,4 - dihydro-3-methyl-4-(2-thioureido)-2H-1,3-benzoxazin-2-one.
38. 6-chloro - 3,4 - dihydro-3-methyl-4-(2-thioureido)-2H-1,3-benzoxazin-2-one.
39. 3,4-dihydro - 3 - methyl - 4 - (2-ureido)-2H-1,3-benzoxazin-2-one.
40. 1,2 - dihydro - 1 - (1-methyl-4-oxo-3-piperidyl)-2-methyl - 3H - naphth[1,2-e][1,3]oxazin - 3 - one hydrochloride.
41. 1-(1-benzoyl - 4 - oxo - 3 - piperidyl)-1,2-dihydro-2-methyl-3H-naphth[1,2-e][1,3]oxazin-3-one.
42. 3,4-dihydro - 3 - methyl - 2 - oxo-2H-1,3-benzoxazin-4-acetic acid.
43. 6 - chloro - 3,4 - dihydro - 3 - methyl - 2 - oxo-2H-1,3-benzoxazin-4-acetic acid.
44. 6-chloro - 3,4 - dihydro-3-methyl-2-oxo-2H-1,3-benzoxazine-4-malonic acid.
45. 6-bromo - 3,4 - dihydro-$\alpha$,3-dimethyl-2-oxo-2H-1,3-benzoxazin-4-acetic acid.
46. 6-bromo - 3,4 - dihydro-$\alpha$,3-dimethyl - 2 - oxo-2H-1,3-benzoxazine-4-malonic acid.
47. 2,3-dihydro - 2 - methyl - 3 - oxo - 1H - naphthoxazin-1-acetic acid.

References Cited

UNITED STATES PATENTS 3,446,804   5/1969   Shavel et al. _____ 260—244
3,296,259   1/1967   Strube _____ 260—244

HENRY R. JILES, Primary Examiner

R. T. BOND, Assistant Examiner

U.S. Cl. X.R.

424—248